Oct. 11, 1927.
Re. 16,767
C. F. JENKINS
FLEXING MIRROR
Original Filed Oct. 31, 1922
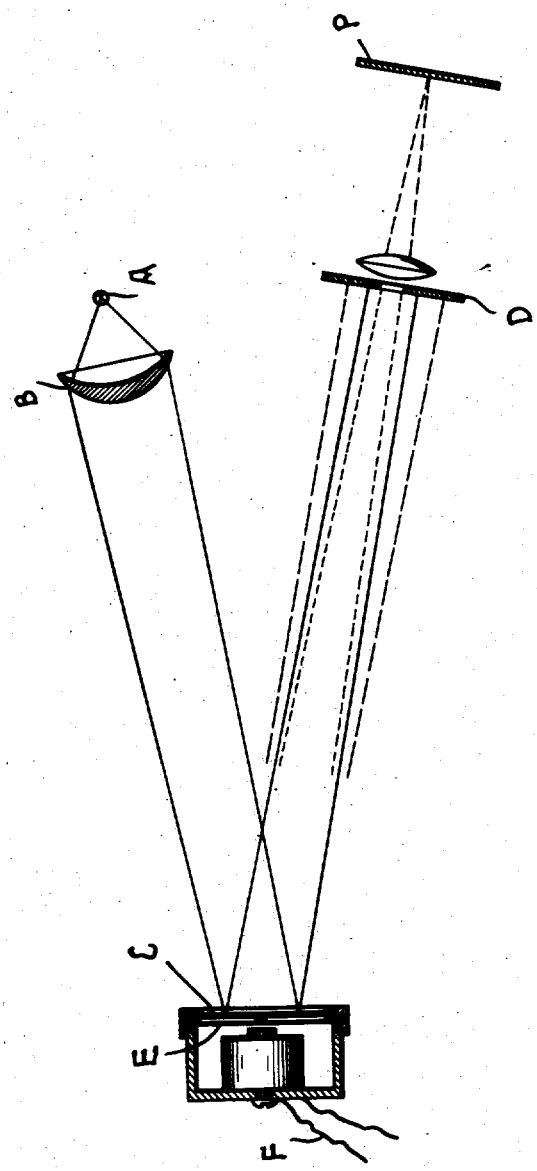
Inventor
CHARLES FRANCIS JENKINS,
By Paul Carpenter
Attorney Reissued Oct. 11, 1927. Re. 16,767

UNITED STATES PATENT OFFICE.

CHARLES FRANCIS JENKINS, OF WASHINGTON, DISTRICT OF COLUMBIA, ASSIGNOR TO JENKINS LABORATORIES, A CORPORATION.

FLEXING MIRROR.

Original No. 1,525,550, dated February 10, 1925, Serial No. 598,145, filed October 31, 1922. Application for reissue filed January 10, 1927. Serial No. 160,318.

This invention relates to apparatus for receiving pictures-by-radio, and has for its principal object means for varying, with a fluctuating current, the intensity of the light falling on a given area.

In the figure, A is a light source; B a lens for gathering the diverging rays of the light source and directing them onto mirror C, from which the light is reflected to an apertured disc D, with a transparent or translucent light aperture therein. The glass mirror C, which may be a strip, a disc, or other shape most suitable for the purpose, is attached to an iron diaphragm E located adjacent to the pole piece of an electric magnet having leads F.

The beam of light directed on the mirror, and from there reflected to the mask D has its boundary shown by solid lines in the drawing. This is the boundary when the diaphragm is in inactive or neutral position.

When the iron diaphragm is pulled down by current in the leads F, the boundary of the beam of light between the mirror E and the mask D will be more concentrated, as shown by the dotted lines, because the mirror is concave. However, when the diaphragm is repelled over the pole of the magnet by current of opposite sign in the leads F, the mirror will be made convex, and the beam reflected therefrom will be wider, as shown bounded by the dash lines. The effect then of a pulsating or alternating current in the leads F is to cause the cross section of the beam of light, where it falls on the mask, to have greater or lesser area. As the area is lessened the intensity over unit area is obviously increased, and if the area considered is that in the middle of the mask D, it is just as obvious that this area will fluctuate in strength of illumination in accord with the amplitude of vibration of the mirror.

This then is the object sought, namely, means for increasing or decreasing the intensity of the illumination of a given area to correspond to the fluctuation in the current strength of the leads F.

The fluctuating current in the leads F follows the light values of pictures being sent from a broadcasting station and picked up in a receiving station, of which this device is a part. The changing intensity of the spot on the mask D is imaged on a photographic plate P in this process of transmitting pictures-by-radio, and is distributed over the plate in proper order to reproduce the original picture by any suitable and well known device.

What I claim is:

1. In apparatus of the class described, a light source, a flexible mirror located to reflect light from said source, an electro-magnet and its armature, the armature being attached to the mirror, a lens in alignment with the axis of the reflected light, and an apertured mask between the lens and light source, the area of the aperture being but a fraction of the area of the adjacent surface of said lens.

2. In combination, a source of light, a light receiving surface, means for directing a beam of light from said source towards said surface, an apertured mask located between said source and said surface to normally permit only a portion of said beam to reach the surface, a lens arranged in alignment with the axis of the reflected light and located between the apertured mask and the light receiving surface and being of materially a greater area than the apertured mask, and means to alternately concentrate and disperse said beam to thereby vary the amount of light transmitted through said means.

3. In combination, a source of light, a light receiving surface, means associated with said source for directing a beam of light along a fixed axis towards said light receiving surface, a light screen located in the path of said beam, said screen being provided with an aperture normally smaller than the beam of light, a lens arranged in alignment with the axis of the reflected light and located between the light screen and the light receiving surface and having an area materially greater than the aperture in the light screen, and means to alternately concentrate and disperse said beam to thereby vary the amount of light transmitted through said aperture.

4. The combination of a source of light of constant intensity, a light receiving surface, means associated with said source for directing a beam of light along a fixed axis towards said light receiving surface, a light screen located in the path of said beam, said screen being provided with an aperture normally smaller than the beam of light, a lens arranged in alignment with the axis of the reflected light and located between the light screen and the light receiving surface and having an area materially greater than the aperture of the screen, and means to vary the concentration of said beam in accordance with light variations of successive picture areas.

5. The combination of a source of light of constant intensity, a light receiving surface, means associated with said source for directing a beam of light along a fixed axis towards the light receiving surface, a light screen located in the path of the beam, said screen being provided with an aperture normally smaller than the beam of light, a lens arranged in alignment with the axis of the reflected light and located between the light screen and the light receiving surface and having an area materially greater than the aperture of the screen, a source of current varying in amplitude in accordance with light variations of a picture being transmitted, and means controlled by said source of current for varying the concentration of said beam in accordance with amplitude variations of said current.

6. The combination of a source of light of constant intensity, a light receiving surface, means including a mirror for directing a beam of light along a fixed axis towards said light receiving surface, a light screen located in the path of said beam, said screen being provided with an aperture normally smaller than the beam of light, a lens arranged in alignment with the axis of the reflected light and located between the light screen and the light receiving surface and having an area materially greater than the aperture of the screen, a source of current varying in amplitude in accordance with light variations of a picture being transmitted, and means controlled by said source of current for flexing said mirror to vary the concentration of said beam in accordance with amplitude variations of said current.

7. The combination of a source of light of constant intensity, a light receiving surface, means associated with said source for directing a beam of light along a fixed axis towards said light receiving surface, a light screen located in the path of the beam, said screen being provided with an aperture normally smaller than the beam of light, a lens arranged in alignment with the axis of the reflected light and located between the light screen and the light receiving surface and having an area materially greater than the aperture of the screen, a source of current varying in amplitude, and means controlled by said source of current for varying the concentration of said beam in accordance with amplitude variations of said current.

In testimony whereof I affix my signature.

CHARLES FRANCIS JENKINS.